Feb. 6, 1945.　　G. T. KOHMAN ET AL　　2,368,665
DISTILLATION METHOD AND APPARATUS
Filed Dec. 17, 1942　　3 Sheets-Sheet 1

INVENTORS: G. T. KOHMAN
C. H. PRESCOTT JR.
BY
ATTORNEY

Feb. 6, 1945.    G. T. KOHMAN ET AL    2,368,665
DISTILLATION METHOD AND APPARATUS
Filed Dec. 17, 1942    3 Sheets-Sheet 2
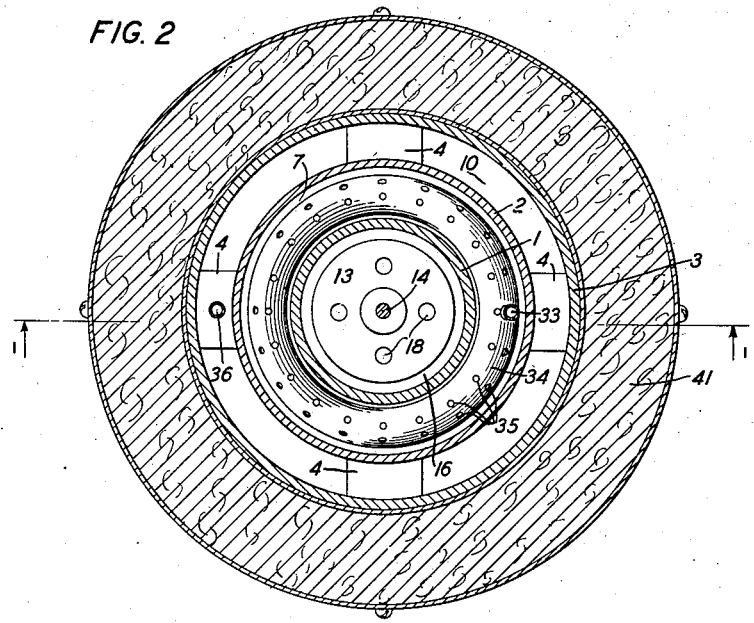
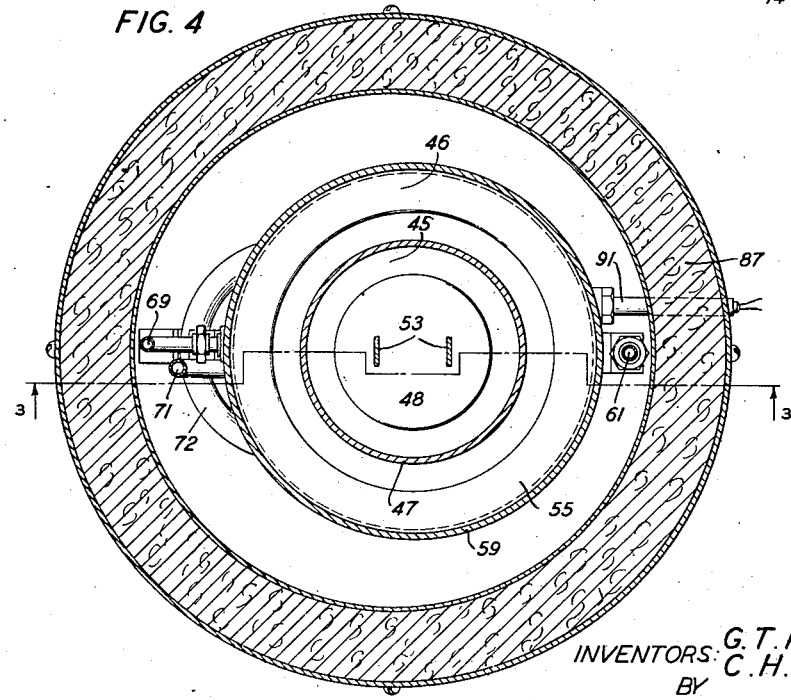
INVENTORS: G. T. KOHMAN
C. H. PRESCOTT JR.
BY
ATTORNEY Feb. 6, 1945.   G. T. KOHMAN ET AL   2,368,665
DISTILLATION METHOD AND APPARATUS
Filed Dec. 17, 1942   3 Sheets-Sheet 3

INVENTORS: G. T. KOHMAN
C. H. PRESCOTT JR
BY
ATTORNEY

Patented Feb. 6, 1945

2,368,665

UNITED STATES PATENT OFFICE 2,368,665

DISTILLATION METHOD AND APPARATUS

Girard T. Kohman, Summit, and Charles H. Prescott, Jr., Boonton, N. J., assignors to Bell Telephone Laboratories, Incorporated, New York, N. Y., a corporation of New York Application December 17, 1942, Serial No. 469,370

18 Claims. (Cl. 202—49)

This application relates to distillation processes and apparatus, and more particularly to method and apparatus involving the use of mechanical energy for distilling an impure liquid to obtain a purified liquid.

The mechanical stills, or apparatus for distilling through the agency of mechanical energy, provided by the present invention may be compact and portable if desired, are simple in operation; and do not require accurate control of operating conditions. Apparatus of the portable manually operated type embodying the invention may be extremely useful for providing potable water from sea water for shipwrecked mariners. Apparatus of the power driven, continuously operating, type embodying the invention may be advantageously employed for general distillation purposes and may be employed to particular advantage in locations where power is available but heat cannot be employed, as in submarines.

The present invention provides a method of distillation, and apparatus operating according to the method, in which a stream of air or other suitable gas is first contacted with a body of the impure liquid which is to be distilled so that the air becomes laden with vapor from said liquid; the vapor-laden air is compressed by a mechanical pump sufficiently to cause liquid to condense from the compressed air under conditions such that as much as possible and in any event most of the resulting heat of condensation passes to the body of impure liquid and raises its vapor pressure; the condensed liquid is collected; the compressed air is expanded through a throttling valve so that the expanded air is in the unsaturated condition; and the air is again contacted with the body of liquid to become laden with vapor therefrom. The above cycle of operations on the circulating stream of air is continuously repeated during operation of the apparatus.

In general, the apparatus embodying the invention comprises a chamber adapted to contain the impure liquid; a chamber adapted to contain the purified liquid; means, advantageously a separating wall of heat conductive material between the chambers, to conduct heat from the chamber adapted to contain the purified liquid to the chamber containing the impure liquid; a suitable pump adapted to remove vapor-laden air from the chamber containing the impure liquid and to compress the air sufficiently to cause vapor to condense therefrom into the liquid while the heat of condensation passes to the body of impure liquid; and means, including valve means through which the air is expanded to the unsaturated state, for conducting the air from the chamber containing the purified liquid back to the chamber containing the purified liquid. The apparatus may be manually operable or power driven. If it is power driven, means may be advantageously provided for continuously supplying impure liquid to the apparatus, for removing excess impure liquid and waste concentrate, and for removing the purified liquid.

The present invention will be explained hereinafter in connection with the accompanying drawings in which:

Fig. 2 is a cross-sectional elevation, along the line 2—2 of Fig. 1, of said still;

Fig. 4 is a cross-sectional elevation along line 4—4 of Fig. 3 of the apparatus of said figure and to the same scale; and Fig. 5 is a sectional elevation of the heat exchanger corresponding to line 5—5 of Fig. 4, but to a larger scale than that of said figure.

Figure 1:
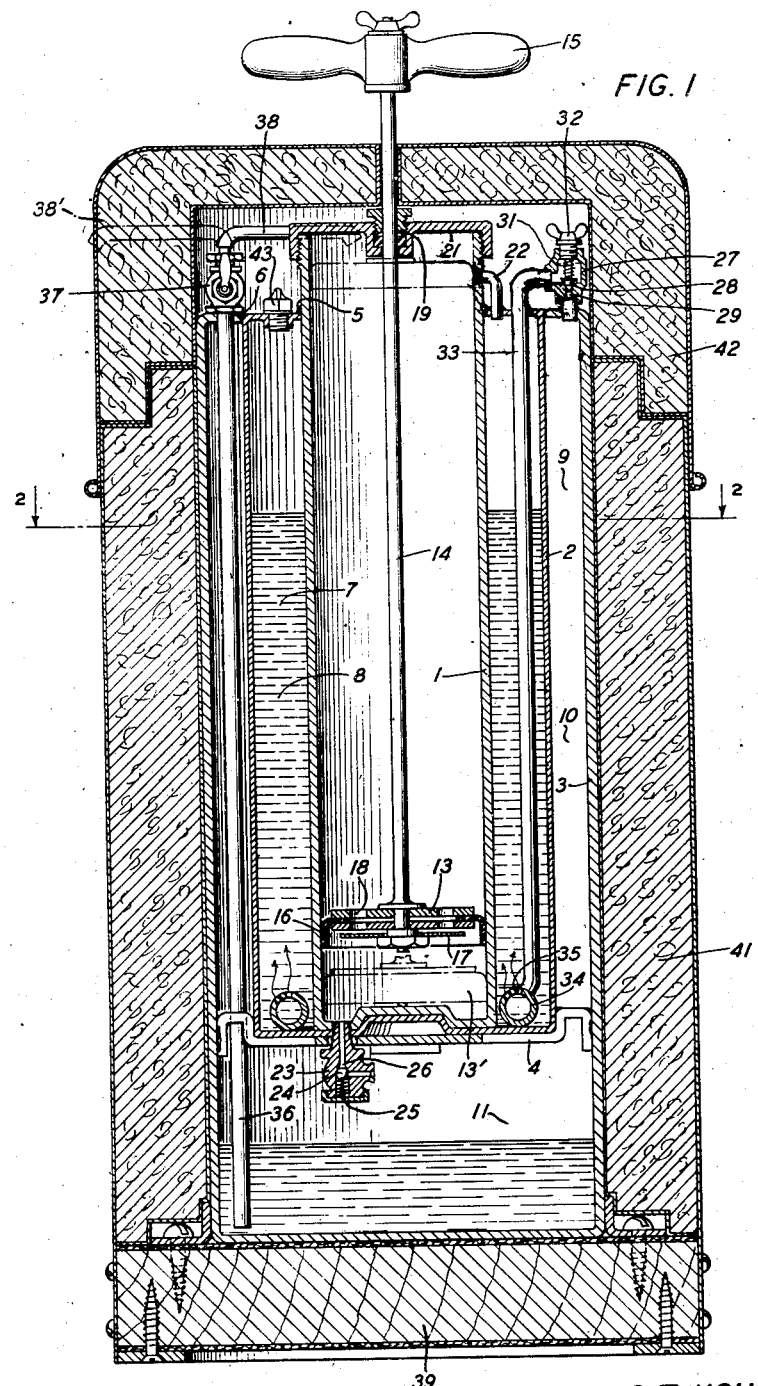
Fig. 1 is a sectional elevation, generally corresponding to line 1—1 of Fig. 2 of a manually operable mechanical still embodying the invention.

The apparatus of Figs. 1 and 2 is a portable hand operable mechanical still embodying the invention, which is useful as life-boat equipment for the purpose of providing a source of potable water from sea water for shipwrecked mariners. For convenience, it will be described hereinafter as adapted to the production of potable water from sea water. The apparatus of these figures comprises a pump cylinder 1 rigidly mounted in a container 2 which in turn is rigidly mounted in a container 3, a supporting spider 4 which is fixed, as by spot welding, to the interior of the container 3 being provided to support and locate the container 2. Containers 2 and 3 are sealed, as by brazing or welding, at points 5 and 6 to provide liquid and air-tight joints. The cylinder 1 and container 2 cooperate to provide an annular chamber 7 which surrounds the cylinder 1 and is adapted to contain the body 8 of sea water. The containers 2 and 3 are arranged to provide a chamber 9 having an annular portion 10 surrounding the chamber 7 and a portion 11 below chamber 7 in which is collected the distilled water. The walls of cylinder 1 and container 2 are shown as formed of metal, which is desirable because of its strength and heat conduction qualities.

Cylinder 1 contains a piston 13 mounted on a rod 14 provided with actuating handle 15. Piston 13 is provided with a flap 16 of a suitable material, such as leather, to provide a tight seal between the piston 13 and the wall of the cylinder 1, and with a valve, formed of a loosely mounted plate 17 and openings 18, which valve opens to permit gas to pass from the portion of the cylinder above the piston to the portion of the cylinder below the piston on the upstroke of the piston and which closes to permit compression of the gas below the piston on the downstroke of the piston. The piston rod 14 is shown as operating through a seal 19 mounted in the upper end closure 21 of the cylinder to prevent escape of substantial amounts of gas past the piston rod.

In the illustrated apparatus, tube 22 provides communication between the upper end of the sea water chamber 7 and the upper end of the interior of cylinder 1. Check valve 23 is shown in the apparatus of Figs. 1 and 2 as providing communication between the bottom of the cylinder 1 and the interior of distilled water chamber 9. The illustrated valve comprises a ball 24 which is urged by spring 25 against the outlet of passage 26 from the cylinder 1. The passage 26 is closed by the ball 24 on the upstroke of the piston 13 and is opened by the pressure developed on the downstroke of the piston. Preferably, the valve is adjusted so that it opens when a pressure only slightly greater than that in chamber 9 is developed within the cylinder 1.

A throttle valve 27 through which the air in chamber 9 discharges and freely expands is provided at the upper portion of chamber 9. The valve 27 shown comprises a needle 28 urged against a valve seat at the end of the inlet orifice 29 of the valve by a spring 31, the pressure of which is adjustable by thumb nut 32. The discharge orifice of the valve 27 is connected to a tube 33 which discharges into an annular tube 34 at the bottom of the chamber 7 containing the sea water. Tube 34 contains perforations 35.

The illustrated apparatus also includes a discharge tube 36 which extends from the bottom of the chamber 9 for containing distilled water and which is at the top thereof provided with a stop cock 37 and swingable discharge nozzle 38. Nozzle 38 is shown as swung into the non-use position but when it is to be employed it is swung to the position 38' indicated by broken lines. A wooden base 39 which provides both strength and heat insulating properties is provided in the illustrated apparatus. To conserve heat, a thick layer 41 of suitable heat insulating material, such as rock wool or spun glass, is provided at the sides of the apparatus, and a heat insulating cover 42 of similar material is provided at the top of the apparatus. The cover 42 may be removed by drawing both it and the pump handle 45 upwardly to provide access to the upper portion of the apparatus, as for adjustment purposes, addition of sea water, or removal of distilled water from the apparatus. A removable plug 43 is shown to provide access to the chamber 7 for addition or removal of sea water or cleaning purposes.

In operation of the apparatus of Figs. 1 and 2, air which is laden and usually saturated with vapor from the body 8 of impure liquid is drawn into the cylinder 1 through tube 22 when the piston 13 is urged downwardly by handle 15. On the upstroke, such vapor-laden air passes through the valve openings 18 into the space in the cylinder 1 below the piston 13. On the next downstroke of the piston, the air is compressed to a substantial pressure which, however, need not necessarily be a high pressure. The valve 23 advantageously is adjusted to open when the pressure in cylinder 1 is only slightly greater than that in chamber 9, so that the pressure developed in the portion of the cylinder 1 below the piston and in the chamber 9 is substantially equal as the piston continues to move downwardly. As pressure is developed in the cylinder, some condensation of the vapor carried by the air may occur in the cylinder, and a considerable portion of the heat of condensation developed may thus pass through the wall 13 of the cylinder into the body 8 of sea water surrounding the cylinder 1. As the piston 13 approaches the lowermost position, indicated by the broken lines 15', the mixture of air, fog and condensed liquid is forced out through valve 23 into the chamber 2. The condensed liquid falls to the lower portion 11 of the chamber 9 where it is collected, and the air containing uncondensed vapor passes upwardly to the upper portion 10 of chamber 9, in the space between the walls of containers 3 and 2, where further condensation of the vapor in the air occurs. As large a portion as possible of the heat of condensation developed is thus caused to pass through the wall of container 2 into the body 8 of sea water. When the air reaches the top of chamber 9, it has lost a considerable portion of its water vapor, although it still contains some vapor. The air expands through valve 27 substantially to atmospheric pressure. The spring 31 of the valve is adjusted so that the valve maintains in the chamber 9 and cylinder 1 a suitable pressure. The pressure developed in the apparatus largely depends upon the dimensions of the apparatus; that is, since the amount of physical energy normally available to operate the apparatus is limited, the pressure developed is largely determined by the piston area. It may lie between 4 and 40 pounds per square inch above atmospheric presure and for advantageous operating conditions should be about 10 pounds per square inch above atmospheric pressure. The nature of the expansion through valve 27 is such that substantially no change in the heat content or temperature occurs as the air passes through the valve, although a large increase in entropy occurs. Thus the air is not cooled substantially, if at all.

The air discharged from the valve 27 into the tube 33 is substantially at atmospheric pressure and is in the unsaturated condition for its temperature and pressure. It passes from tube 33 into annular tube 34 and out through perforations 35 so that it bubbles upwardly through the body 8 of sea water and again becomes laden with vapor from the impure liquid. The vapor-laden air then passes through tube 22 into pump cylinder 1 and the cycle is repeated indefinitely as the piston 13 is reciprocated. For each circulation of the stream of air, vapor is carried by the air from the body of sea water, and is condensed and collected as a purified liquid.

The condensation of the vapor and the passage of most of its heat of condensation into the body 8 of sea water cause the vapor pressure of the sea water to rise and thus increase the efficiency of the apparatus. During operation of the apparatus, the temperature of the internal portions of the apparatus and the liquid therein rises to a point determined by rate of heat loss due to heat conduction, radiation and other causes. In an efficiently designed apparatus, the temperature may approach the boiling point of water. As the temperature increases and the air in the system expands, some of the air escapes from the system past the seal 19 around the piston rod 14.

From time to time, the cover 42 may be removed, the nozzle 38 swung to the discharge position 28', and purified liquid be discharged from the still. Pressure may be built up in the still by pumping to facilitate discharge. For this purpose it is also advantageous to close entirely the valve 27 by turning thumb screw 32.

The method of operation is essentially an isothermal one, since there are no substantial temperature changes at any step.

Figure 3:
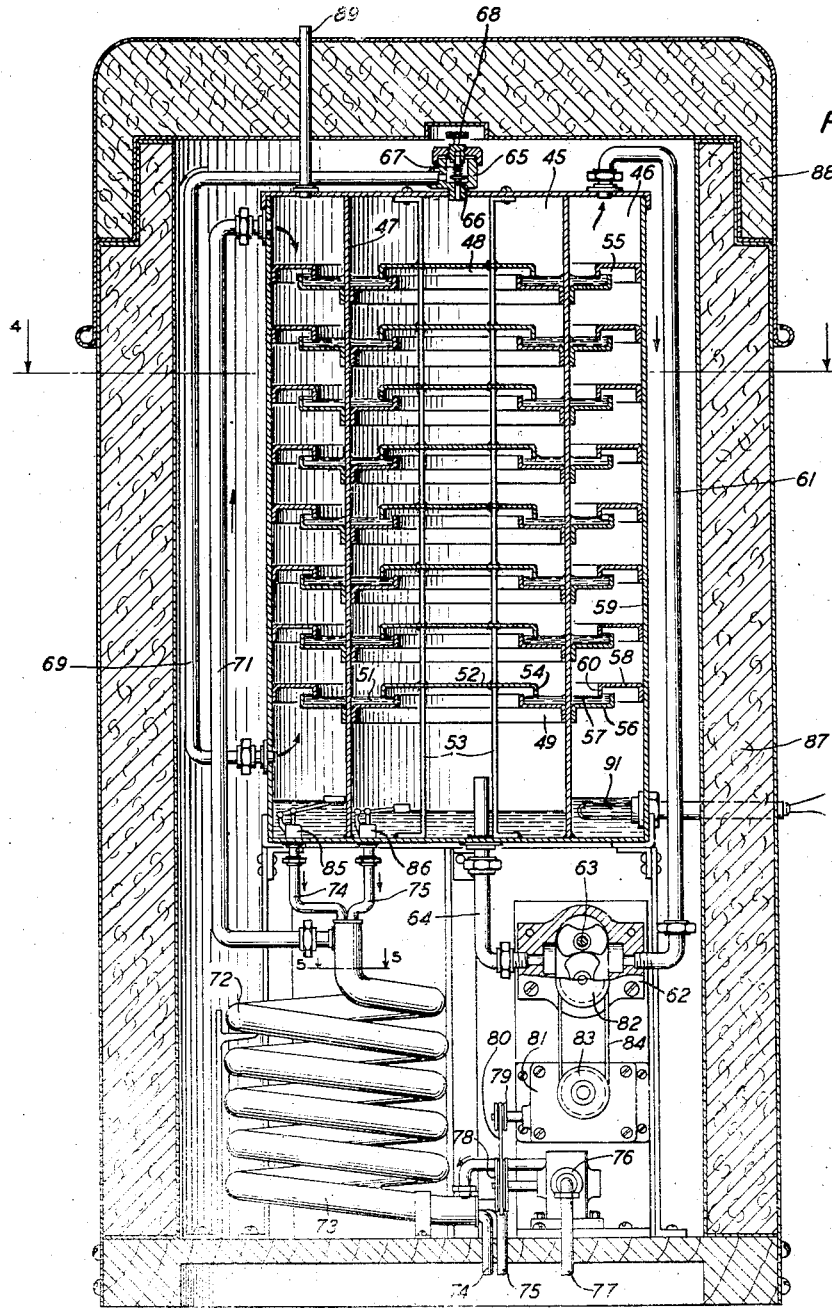
Fig. 3 is a sectional elevation, generally corresponding to line 3—3 of Fig. 4, of a power driven mechanical still embodying the present invention, this figure being to a scale smaller than that of Figs. 1 and 2.

The apparatus of Figs. 3 to 5 inclusive, is a power driven, substantially continuously operating mechanical still, embodying the invention and is useful for general distillation purposes or in installations where mechanical power is available but heat is not available, or its use is unfeasible or undesirable. Indeed, an efficiently designed power-driven apparatus embodying the present invention may, because it conserves and uses the heat of condensation, be more economical than conventional heat operated stills which waste such heat. For convenience and illustrative purposes, the apparatus of these figures will be discussed hereinafter in connection with the distillation of impure water, such as sea water, to provide purified, distilled water.

The apparatus of these figures comprises an inner chamber 45 and surrounding it, an outer annular chamber 46, the two chambers being separated by a heat conductive wall 47 of metal. The inner chamber 45 which is adapted to contain and have condensed therein the purified water is provided with a plurality of bubble plates 48 which serve to facilitate condensation of vapor, separation of liquid from the air, and conduction of heat into the outer chamber 46. Each of the illustrated bubble plates 48 is formed of a lower annular member 49 of metal or other material of good heat conductivity which is fixed to the inner surface of wall 47, as by pressing, brazing, or welding to form a heat conductive joint and to form an annular trough 51 adapted to contain liquid. Associated with each plate 48 is an upper cap plate 52 supported by rods 53 to which it is fixed and having a downwardly turned edge 54 extending into trough 51, as shown. A sufficient number of bubble plates 48 are present to provide good heat conductivity and removal of liquid from the air.

Similar bubble plates 55 are present in outer chamber 46. Each bubble plate 55 comprises a lower annular member 56 mounted on the outer surface of wall 47 and fixed thereto as by pressing, brazing or welding, to form a heat conductive joint. Each plate 55 is shaped to provide a trough 57 for containing liquid. A cooperating upper plate 58, which is provided for each plate 56, is similarly mounted on the outer wall 59 of the chamber 46 and is shaped with a downwardly projecting edge 60 extending into trough 57 as shown. The purpose of bubble plates 56 in the outer chamber 46 is to promote the addition of vapor to the air passing through chamber 46 and to promote the conduction of heat to the impure water.

Tube 61 communicating with the upper portion of chamber 46 is connected to the inlet side of a pump 62 which is removed from the chamber 46 containing the impure water in the sense that there is no direct metallic connection between the pump and said chamber for conducting heat from the pump to the chamber, as is present in the first embodiment of the invention. Because of the nature of the distilling operation, it is advantageous that the pump be a positive displacement pump. A rotary positive displacement pump, such as the Roots pump shown, is advantageous because it provides a positive displacement and continuous flow without excessive air turbulence, and a large capacity at moderate pressure. While a reciprocatory piston pump might be employed, such a pump is characterized by the disadvantage that it causes considerable discontinuity or turbulence of flow. A centrifugal blower type pump is in general undesirable because of the difficulty of obtaining the required pressures with such a pump.

Pump 62 is driven by a suitable source of power, not shown, applied to shaft 63. The pump discharges through tube 64 into the lower portion of inner chamber 45. Air from said chamber discharges and expands through throttling valve 65. This valve comprises needle 66 pressed by spring 67 which is adjustably controlled by nut 68 to maintain a suitable pressure of the air in the chamber 45. It is advantageous that the valve 65 be adjusted to provide a pressure in chamber 45 of approximately four to five pounds per square inch. The air, after expansion through valve 65, passes through tube 69 into the lower portion of outer chamber 46. Impure water, such as salt water, is supplied to the upper portion of outer chamber 47 through tube 71 which in turn is supplied through heat exchanger 72.

The illustrated heat exchanger 72 comprises a coil of tubing 73 of relatively large diameter containing therein two lengths of tubing 74 and 75 of smaller diameter, as is shown to advantage in Fig. 5. The space between the inside of tube 73 and the outside of tubes 74 and 75 conducts the impure water supplied to the system. This liquid is supplied to the heat exchanger in the illustrated apparatus by a suitable pump 76, the inlet pipe 77 to which communicates with a suitable source of impure water. Pump 76 is shown as being driven by pulleys 78, 79 and belt 80 from speed reduction means 81 which, in turn, is driven from pump 63 by pulleys 82, 83 and belt 84.

Tube 74 of heat exchanger 72 is connected to the bottom portion of outer chamber 46 and conducts away excess impure liquid supplied to said chamber. Tube 75 is connected to the lower portion of inner chamber 45 and conducts away purified liquid which has been collected in said chamber. The liquids being removed from the system by passing through tubes 74 and 75 are at elevated temperature, and give up heat in heat exchanger 72, to the impure water being supplied to the system, with a consequent conservation of heat and entropy. A suitable float valve 85 is shown in the chamber 46 to control the removal of the excess impure water from said chamber and to prevent the level of the liquid in the chamber from rising beyond a predetermined amount. Preferably, the valve 85 is such that it provides a continuous flow of liquid and not a sharp cut-off of the flow, since a constant flow of liquid is advantageous for efficient operation of heat exchanger 72. A similar valve 86 is shown as provided in chamber 45 to control the flow of purified water through tube 75 and to control the level of the water in chamber 45. It is also advantageous for efficient operation of the heat exchanger 72 that valve 86 provide a continuous flow of water.

To conserve heat more efficiently, it is desirable that the inlet pump 76 and at least the lower portion of the heat exchanger 72, both of which contain liquids at relatively low temperatures, be covered with heat insulating material, not shown.

As shown in Figs. 3 and 4, the apparatus is enclosed in a layer 87 of a suitable heat insulating material such as rock wool or the like, and is provided with a removable cover 88 of similar heat insulating material. Such heat insulation adds to the efficiency of the apparatus by conserving heat. In the illustrated apparatus, moreover, a vent tube 89 is provided to equalize the pressure between the atmosphere and the interior of the chamber 46 and to permit the escape of air from the system as the system becomes heated and the air therein expands during operation.

An auxiliary heating means 91, shown as an electrical heater, is provided in the lower portion of the outer chamber 46. This heating means may be advantageously employed to heat the impure water in the system at the commencement of operation of the apparatus to bring the apparatus to its full operating efficiency sooner than would otherwise be the case. Such heating means may, of course, be employed during operation of the apparatus but in general heating during operation is unnecessary.

In operation of the apparatus of Figs. 3 to 5 inclusive, impure liquid, as sea water, is drawn through the tube 77 by pump 76 and passed through heat exchanger 72 and tube 71, from which it is discharged into the upper portion of chamber 46. The liquid trickles downwardly over and through the bubble plates 55, some of it remaining in the troughs 57. The excess liquid collects in the lower portion of chamber 46 and discharges through valve 85 and tube 74 through heat exchange 72. As indicated above, this operation advantageously in a continuous operation although it may be intermittent if desired.

Air laden, and advantageously saturated with, vapor from the impure water is drawn from the upper portion of chamber 46 through tube 61 into the inlet of pump 62. The vapor-laden air is compressed by pump 62 and passed through tube 64 into the lower portion of chamber 45. In some cases some condensation might occur in pump 63, but in general, because of the speed of travel and heat of compression, the vapor-laden air is discharged into chamber 45 before appreciable condensation occurs.

The air travels upwardly in chamber 45, passing through the tortuous paths between the plates 49 and 52 of the bubble plates 48 and bubbling through the liquid which collects in trough 51. As the compressed air travels upwardly, vapor condenses from the air and deposits as a liquid on the inner surface of the wall 47 and on the bubble plates 48. The liquid collects in the trough 51 of each bubble plate, overflows therefrom, and eventually collects in the lower portion of the chamber 45. Meanwhile, a large portion of the heat of condensation of the vapor being condensed passes through heat conductive wall 47 into the liquid in chamber 46, the passage of heat being facilitated by the bubble plates 48.

When the air reaches the upper portion of chamber 45 it has lost most, if not all, of its excess liquid vapor. It discharges through valve 65 in which it is expanded to substantially atmospheric pressure. The passage of the air through said valve does not appreciably change the total heat content or temperature of the air, although it causes a considerable increase in the entropy. The air, therefore, is not cooled substantially, if at all. The expanded air, which is in the unsaturated condition for its temperature and pressure, pass through tube 69 to the lower portion of chamber 46. The air in chamber 46 passes upwardly in a tortuous path through and between the bubble plates 55. In this passage, the air intimately contacts the impure water by bubbling through the water contained in the trough 57 and passing in contact with the water trickling downwardly through the chamber. When the air reaches the upper portion of chamber 46, it is laden with vapor, usually being fully saturated.

The cycle of operations upon the air is repeatedly performed during operation of the apparatus so that as the air circulates through the system, it conducts vapor from the body of impure water, is compressed to cause condensation of the vapor therefrom with passage of heat of condensation to the body of impure liquid expanded and again contacted with the impure water, the condensed purified liquid being collected in the lower portion of the chamber 45. The collected purified water is continuously removed from the system through valve 86 and tube 75, and the excess impure water is removed through valve 85 and tube 74, although intermittent removal is possible if desired.

The cycle of operations is essentially an isothermal cycle since there is no substantial temperature change in any portion of the cycle. However, the temperature of the apparatus and of the liquid gradually increases and approaches the boiling temperature of the liquid, the upper limit of the temperature being determined by the rate of heat losses from the apparatus.

Both forms of apparatus described above are, as is apparent, simple, inexpensive and compact in construction. They are effective in permitting the recovery of purified liquid from impure liquids solely through the expenditure of mechanical energy. Moreover, the method of operation of each of the described forms of apparatus is such that no critical operating conditions are required. In this respect, the method and apparatus of the present invention are superior to prior methods and apparatus.

Each of the above-described embodiments of the invention is illustrative only, and it is apparent that various modifications may be made therein and in their modes of operation, and that other forms of apparatus and other modes of operation may be devised without departing from the spirit of the invention. For example, whereas the invention was discussed in connection with the distillation of impure water to provide purified water, it is apparent that the invention may be applied to the distillation of liquids other than water. Moreover, whereas the invention was disclosed in connection with the use of air as the vapor-carrying gas, it is apparent that other suitable gases may be employed for these purposes; obviously the vapor-carrying gas should be one which does not itself condense under the pressures employed during the process and which is capable of carrying vapors of the liquid to be distilled. In the appended claims the term "air" is intended to include such gases as well as air.

It is intended that the patent shall cover, by suitable expression in the appended claims, whatever features of patentable novelty reside in the invention.

What is claimed is:

1. The process for distilling a liquid comprising contacting a portion of a circulating essentially constant mass of air with a body of the liquid to be distilled under conditions which cause the air to become laden with vapors of the liquid; compressing the vapor-laden air sufficiently to cause vapor carried by the air to condense; condensing the vapor carried by said compressed vapor-laden air while its pressure is greater than the pressure of the vapor-laden air prior to compression and while said vapor-laden air is out of contact with said body of liquid but under conditions such that substantially all of the heat of condensation of the condensate passes into said body of liquid, meanwhile collecting the condensate; expanding said air from which vapor has been condensed to substantially its original pressure before compression to cause said air to be in the unsaturated state; and contacting substantially all of said expanded air with said body of liquid to be distilled to commence repetition of the cycle.

2. The process for distilling a liquid comprising contacting a portion of a circulating essentially constant mass of air with a body of the liquid to be distilled under conditions which cause the air to become laden with vapors of the liquid; compressing the vapor-laden air sufficiently to cause vapor carried by the air to condense; condensing the vapor carried by said compressed vapor-laden air while its pressure is greater than the pressure of the vapor-laden air prior to compression and while said vapor-laden air is out of contact with said body of liquid but under conditions such that substantially all of the heat of condensation of the condensate passes into said body of liquid, meanwhile collecting the condensate; rapidly expanding said air from which vapor has been condensed, without substantial cooling of the air, to substantially its original pressure before compression to cause said air to be in an unsaturated state; and contacting substantially all of said expanded air with said body of liquid to be distilled to commence repetition of the cycle.

3. The process for distilling a liquid comprising repeatedly performing upon a circulating stream of air an essentially isothermal cycle of operations comprising adding to the stream of air vapors from a body of the liquid to be distilled; compressing the vapor-laden air sufficiently to cause to to condense; condensing the vapor carried by said compressed vapor-laden air while its pressure is greater than the pressure of the vapor-laden air prior to compression and while said vapor-laden air is out of contact with said body of liquid but under conditions such that substantially all of the heat of condensation of the condensate passes into said body of liquid, meanwhile collecting the condensate; rapidly expanding the air from which vapor has been condensed, without substantial cooling of said air, to substantially its original pressure before compression to cause said air to be in the unsaturated state; and again adding to substantially all of said air vapors from said body of liquid to be distilled, whereby the cycle of operations is recommenced.

4. The process for distilling a liquid comprising contacting a portion of a circulating essentially constant mass of air with a body of the liquid to be distilled under conditions which cause the air to become laden with vapors of the liquid; compressing the vapor-laden air sufficiently to cause vapor carried by the air to condense; condensing the vapor carried by said compressed vapor-laden air while its pressure is greater than the pressure of the vapor-laden air prior to compression and while said vapor-laden air is out of contact with said body of liquid but under conditions such that substantially all of the heat of condensation of the condensate passes into said body of liquid; expanding said air from which vapor has been condensed to substantially its original pressure before compression to cause said air to be in the unsaturated state; contacting substantially all of said expanded air with said body of liquid to be distilled to commence repetition of the cycle; continuously collecting the condensate resulting from condensation of the vapor from the air; and continuously adding liquid to said body of liquid which is to be distilled.

5. The process for distilling a liquid comprising contacting a portion of a circulating essentially constant mass of air with a body of the liquid to be distilled under conditions which cause the air to become laden with vapors of the liquid; compressing the vapor-laden air sufficiently to cause vapor carried by the air to condense; condensing the vapor carried by said compressed vapor-laden air while its pressure is greater than the pressure of the vapor-laden air prior to compression and while said vapor-laden air is out of contact with said body of liquid but under conditions such that substantially all of the heat of condensation of the condensate passes into said body of liquid; expanding said air from which vapor has been condensed to substantially its original pressure before compression to cause said air to be in the unsaturated state; contacting substantially all of said expanded air with said body of liquid to commence repetition of the cycle; collecting and withdrawing the condensate resulting from the condensation of vapor from the air; and adding liquid to the body of liquid to be distilled, said added liquid being preheated by out-of-contact and counterflow heat-exchange with the condensate being withdrawn.

6. Distillation apparatus comprising a first chamber adapted to contain liquid which is to be distilled; a pump adapted to withdraw from said first chamber air laden with vapor from said liquid and to compress said vapor-laden air; a second chamber adapted to receive the compressed vapor-laden air from said pump and to have condensed therein into a liquid condensate vapor from said compressed air; means for transferring from said second chamber to said first chamber heat of condensation of said condensed vapor; and means, including valve means which maintains an elevated pressure of the vapor-laden air in said second chamber and which relieves the pressure of the air as it passes through said valve means, for conducting substantially all the air from said second chamber to said first chamber in which it again becomes laden with vapor from said liquid which is to be distilled.

7. Distillation apparatus comprising a first chamber adapted to contain liquid which is to be distilled; a second chamber adapted to contain liquid condensate resulting from distillation and separated from said first chamber by a heat conductive wall; a pump adapted to withdraw from said first chamber air laden with vapor from said liquid which is to be distilled, to compress said vapor-laden air, and to pass said compressed vapor-laden air to the interior of the second chamber in which vapor from said compressed air condenses into a liquid condensate and from which heat of condensation passes through said wall into said first chamber; and means, including valve means which maintains an elevated pressure of the vapor-laden air in said second chamber and which relieves the pressure of the air as it passes through said valve means, for conducting substantially all the air from said second chamber to said first chamber in which the air again becomes laden with vapor from said liquid which is to be distilled.

8. Distillation apparatus comprising a first chamber adapted to contain liquid which is to be distilled; a pump adapted to withdraw from said first chamber air laden with vapor from said liquid which is to be distilled and to compress said vapor-laden air; a second chamber adapted to receive the compressed vapor-laden air from said pump and to have condensed therein into a liquid condensate vapor from said compressed air; means for transferring from said second chamber to said first chamber heat of condensation of said condensed vapor; means, including valve means which maintains an elevated pressure of the vapor-laden air in said second chamber and which relieves the pressure of the air as it passes through said valve means, for conducting substantially all the air from said second chamber to said first chamber in which it again becomes laden with vapor from said liquid which is to be distilled; and means in said first chamber for intimately contacting the air with said liquid to cause it to become laden with vapor.

9. Distillation apparatus comprising a first chamber adapted to contain liquid which is to be distilled; a second chamber, which is surrounded by said first chamber and which is separated therefrom by a heat conductive wall, adapted to contain liquid condensate resulting from distillation; means for withdrawing from said chamber air laden with vapor from said liquid to be distilled and for compressing said vapor-laden air in said second chamber sufficiently to cause vapor from said compressed air to condense into a liquid condensate while heat of condensation passes through said wall into said first chamber; and means, including valve means which maintains an elevated pressure of the vapor-laden air in said second chamber and which relieves the pressure of the air as it passes through said valve means, for conducting substantially all the air from said second chamber to said first chamber in which the air again becomes laden with vapor from said liquid which is to be distilled.

10. Distillation apparatus comprising a pump cylinder; a chamber surrounding the pump cylinder which is adapted to contain liquid to be distilled in contact with the exterior of said pump cylinder, the interior of which chamber communicates with the interior of the pump cylinder; a reciprocatory piston in said pump cylinder adapted to withdraw from the interior of said chamber air laden with vapor from the said liquid and to compress such vapor-laden air sufficiently to cause vapor to condense from said air into a liquid condensate with passage of heat of condensation through the cylinder wall into said liquid to be distilled in said chamber; and means, including valve means for relieving the pressure of the air, for conducting the air from said pump cylinder into said chamber in which the air again becomes laden with vapor from said liquid to be distilled.

11. Distillation apparatus comprising a pump cylinder, a chamber surrounding the pump cylinder which is adapted to contain liquid to be distilled in contact with the exterior of said pump cylinder, the interior of which chamber communicates with the interior of said pump cylinder; a reciprocatory piston in said pump cylinder adapted to withdraw from the interior of said chamber air laden with vapor from the said liquid and to compress such vapor-laden air sufficiently to cause vapor to condense therefrom into a liquid condensate; a second chamber into which said compressed air and said condensate pass from said cylinder and in which said condensate collects; and means, including valve means for releasing the pressure of the air, for conducting the air from said second chamber into said first chamber in which the air again becomes laden with vapor from said liquid to be distilled.

12. Distillation apparatus comprising a pump cylinder; a chamber surrounding said pump cylinder which is adapted to contain liquid to be distilled in contact with the exterior of said pump cylinder, the interior of which chamber communicates with the interior of said pump cylinder; a reciprocatory piston in said pump cylinder adapted to withdraw from the interior of said chamber air laden with vapor from said liquid and to compress such air sufficiently to cause vapor to condense therefrom into a liquid condensate; a container surrounding said pump cylinder and having a heat conductive wall in contact with said liquid to be distilled in said chamber, into which container said compressed air is urged by said piston and in which vapor condenses from said compressed air while heat of condensation passes through said wall into said liquid to be distilled in said chamber; and means, including valve means for relieving the pressure of the air, for conducting the air from said container into said chamber in which the air again becomes laden with vapor from said liquid to be distilled.

13. Distillation apparatus comprising a pump cylinder; a chamber surrounding said pump cylinder which is adapted to contain liquid to be distilled in contact with the exterior of said pump cylinder, the interior of which chamber communicates with the interior of said pump cylinder; a reciprocatory piston in said pump cylinder adapted to withdraw from interior of said chamber air laden with vapor from said liquid and to compress such air sufficiently to cause vapor to condense therefrom into a liquid condensate; a container surrounding said chamber which contains said liquid to be distilled and having a heat conductive wall in contact with said liquid in said chamber, into which container said compressed air is passed by said piston and in which vapor condenses from said compressed air into a liquid condensate while heat of condensation passes through said wall into the said liquid to be distilled in said chamber; and means, including valve means for relieving the pressure of the air, for conducting the air from said container into said chamber in which the air again becomes laden with vapor from said liquid to be distilled.

14. Distillation apparatus comprising a first chamber adapted to contain liquid which is to be distilled; a power-driven pump located outside of said chamber adapted to withdraw from said first chamber air laden with vapor from said liquid and to compress said vapor-laden air; a second chamber adapted to receive the compressed vapor-laden air from said pump and to condense therein into a liquid condensate vapor from said compressed air; means for transferring from said second chamber to said first chamber heat of condensation of said condensate; and means, including valve means which maintains an elevated pressure of the vapor-laden air in said second chamber and which relieves the pressure of the air as it passes through said valve means, for conducting substantially all the air from said second chamber to said first chamber in which it again becomes laden with vapor from said liquid to be distilled.

15. Distillation apparatus comprising a first chamber adapted to contain liquid which is to be distilled; a power-driven pump located outside of said chamber adapted to withdraw from said first chamber air laden with vapor from said liquid and to compress said vapor-laden air; a second chamber adapted to receive the compressed air from said pump and to condense therein into a liquid condensate vapor from said compressed air; means for transferring from said second chamber to said first chamber heat of condensation of said condensate; means, including valve means which maintains the pressure of the vapor-laden air in said second chamber and which relieves the pressure of the air as it passes through said valve means, for conducting the air from said second chamber to said first chamber in which it again becomes laden with vapor from said liquid to be distilled; means for automatically supplying liquid to be distilled to said first chamber; and means for automatically discharging excess liquid from said first chamber.

16. Distillation apparatus comprising an inner chamber adapted to contain liquid condensate; an outer chamber surrounding the inner chamber and separated from it by a heat conductive wall adapted to contain liquid which is to be distilled; a power-driven pump located outside of said chambers adapted to withdraw from said outer chamber air laden with vapor from said liquid to be distilled, to compress said vapor-laden air and to pass said vapor-laden air to said inner chamber in which vapor condenses from said air into a liquid condensate and from which heat of condensation passes into said liquid to be distilled in the outer chamber; and means, including valve means which maintains the pressure of the vapor-laden air in said inner chamber and which relieves the pressure of the air as it passes through said valve means, for conducting the air from said inner chamber to said outer chamber in which it again becomes laden with vapor from said liquid to be distilled.

17. Distillation apparatus comprising an inner chamber adapted to contain liquid condensate; an outer chamber surrounding the inner chamber and separated from it by a heat conductive wall adapted to contain liquid which is to be distilled; a power-driven pump located outside of said chambers adapted to withdraw from said outer chamber air laden with vapor from said liquid to be distilled, to compress said vapor-laden air and to pass said vapor-laden air to said inner chamber in which vapor condenses from said air into a liquid condensate and from which heat of condensation passes into said liquid to be distilled in the outer chamber; means, including valve means which maintains an elevated pressure of the vapor-laden air in said inner chamber and which relieves the pressure of the air as it passes through said valve means, for conducting the air from said inner chamber to said outer chamber in which it again becomes laden with vapor from said liquid to be distilled; means in said outer chamber for bringing the stream of air into intimate contact with said liquid to be distilled; and means in said inner chamber for promoting removal of vapor from the compressed air and conducting heat to the outer chamber.

18. Distillation apparatus comprising an upright inner chamber adapted to contain liquid condensate; an upright outer chamber, surrounding said inner chamber and separated from it by a heat conductive wall, adapted to contain liquid to be distilled; a power-driven rotary positive displacement pump adapted to withdraw from said outer chamber air laden with vapor from said liquid to be distilled, to compress said vapor-laden air and pass it to said inner chamber in which vapor condenses from said air into a liquid condensate and from which heat of condensation passes into said outer chamber; means, including valve means which maintains an elevated pressure of said vapor-laden air in said inner chamber and which abruptly relieves the pressure of the air as it passes through said valve means, for conducting air from the upper portion of said inner chamber to the lower portion of said outer chamber; means for supplying liquid to be distilled to the upper portion of said outer chamber; means for withdrawing the excess liquid from the lower portion of said outer chamber; and means providing an exchange of heat between the liquid being supplied to said outer chamber and the liquid being removed from said chamber.

GIRARD T. KOHMAN.
CHARLES H. PRESCOTT, Jr.